United States Patent

[11] 3,595,023

| [72] | Inventor | Karl Stockel<br>Ottobrunn, Germany |
|---|---|---|
| [21] | Appl. No. | 698,377 |
| [22] | Filed | Jan. 11, 1968 |
| [45] | Patented | July 27, 1971 |
| [73] | Assignee | Bolkow Gesellschaft mit beschraukter Haftung, Ottobrunn, Germany |
| [32] | Priority | Jan. 16, 1967 |
| [33] | | Germany |
| [31] | | B 90747 |

[54] ROCKET ENGINE COMBUSTION CHAMBER COOLING
14 Claims, 3 Drawing Figs.

[52] U.S. Cl. .................................................. 60/260,
60/265, 60/267, 239/127.3
[51] Int. Cl. ........................................................ F02k 9/02
[50] Field of Search........................................... 60/260,
261, 39.66; 239/127.1, 127.3

[56] References Cited
UNITED STATES PATENTS

| 2,183,313 | 12/1939 | Goddard | 60/39.71 |
| 2,487,435 | 11/1949 | Goddard | 60/260 |
| 2,551,112 | 5/1951 | Goddard | 60/260 |
| 2,705,399 | 4/1955 | Allen | 239/127.3 |
| 3,157,026 | 11/1964 | Lampert | 239/127.1 |
| 3,304,008 | 2/1967 | Beam, Jr. | 239/127.3 |
| 3,313,488 | 4/1967 | Lovingham | 239/127.1 |

Primary Examiner—Samuel Feinberg
Attorney—McGlew and Toren

ABSTRACT: A liquid-cooled rocket combustion chamber construction includes a thrust nozzle and is characterized by the cooling of the walls using a plurality of separate cooling circuits which are independent form each other.

In one embodiment the combustion chamber includes a first or head section which comprises the combustion chamber and a convergent wall portion of the nozzle which is joined through a flange to a second or trailing section which includes a small convergent portion and the divergent portion of the nozzle. A nozzle insert is formed as a continuation of the convergent and divergent portions. At least one first cooling circuit includes a plurality of axially extending passages defined along the length of the head section and trailing section. A second circuit for cooling includes an annular inlet which is connected at the divergent trailing end of the nozzle insert and provides means for directing a fluid in counterflow arrangement along the nozzle section wall and then for directing the cooling fluid in the form of a mist into the combustion chamber at the nozzle section.

Another embodiment includes three separate and independent wall coding circuits, one fluid circuit comprising means for circulating a cooling fluid in association with the walls of the combustion chamber head section and another circuit providing means for circulating fluid in association with the trailing section, and a third fluid conduit connection for the nozzle insert.

PATENTED JUL 27 1971
3,595,023
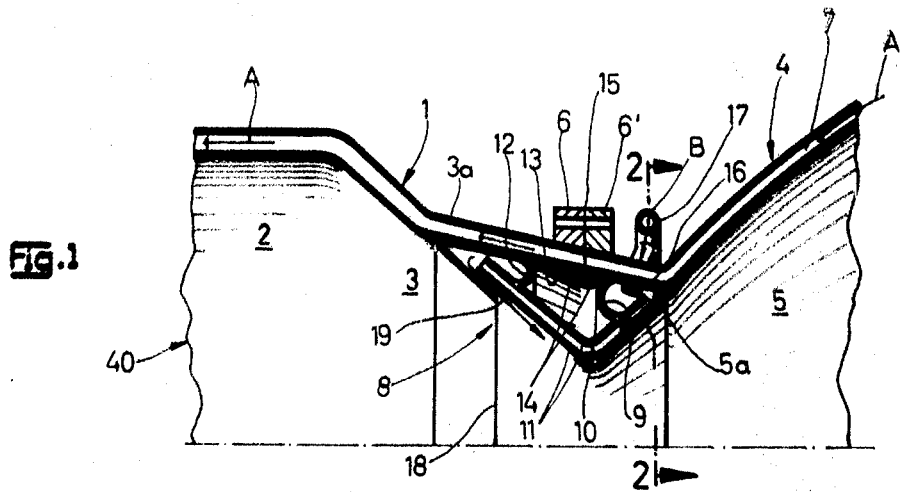
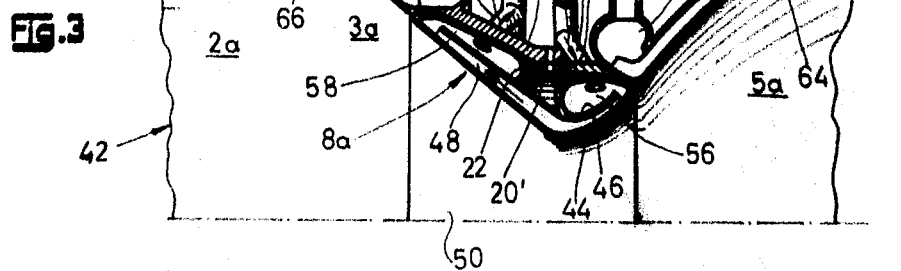
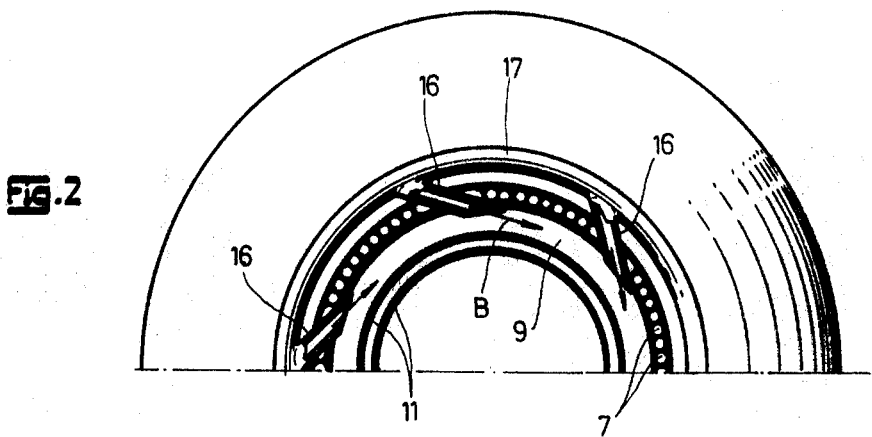
INVENTOR
Karl Stöckel
by *MunGlew and Toren*
ATTORNEYS

ROCKET ENGINE COMBUSTION CHAMBER COOLING

SUMMARY OF THE INVENTION

This invention relates in general to the construction of the liquid-cooled combustion chambers and in particular to a new and useful liquid-cooled combustion chamber of a rocket engine having a thrust nozzle wherein a plurality of separate cooling circuits are provided which are totally independent of each other and which provide cooling for the walls of the combustion chamber and nozzle section.

Liquid-cooled combustion chambers for rocket engines having thrust nozzles are known in various embodiments. A customary cooling for such combustion chambers includes the introduction of a cooling fluid such as liquid oxygen into the trailing end or gas discharge end of the thrust nozzle through an annular channel or chamber which connects into the thrust nozzle walls. The thrust nozzle walls include cooling ducts or channels which extend in a longitudinal or axial direction. The liquid oxygen is directed in a direction opposite to the thrust gas discharge to the inner end of the combustion chamber at which the combustion is initiated. A cooling arrangement for the nozzle neck of the rocket combustion chamber in the form of several parallel ring-shaped cooling channels which are supplied with a cooling liquid through individual inlet lines and a current supply line is also known. The cooling of the neck portion is accomplished by sweat cooling wherein the cooling liquid penetrates through the wall of a nozzle neck through openings defined therein. This kind of cooling is not sufficiently controllable and there is a danger that the pores will be narrowed or blocked by contaminants. A further disadvantage is that the nozzle neck potion tends to wear much faster than the remaining part because of the stringent operational requirements, and thus the entire unit becomes unusable if it is constructed in a single piece. Variations of the above construction are known for cooling the nozzle section of a combustion chamber, and all of them have the disadvantage that after wear of the thrust nozzle necks, the entire thrust nozzle cannot be used any longer and has to be replaced. In addition, the known constructions operate with very high thermic stresses resulting in difficulty in obtaining the proper cooling of the total unit, including the combustion chamber and the thrust nozzle to the extent that the combustion chamber proper is not cooled at all.

In accordance with the present invention, the defects of the known constructions are overcome by providing a plurality of cooling circuits for the total combustion chamber construction including the nozzle. In addition, the construction advantageously comprises several individual sections which together form the combustion chamber and the nozzle and preferably includes a removable nozzle neck insert. The construction advantageously includes a separate cooling circuit for the nozzle insert and one or more cooling circuits which extend along the length of the combustion chamber.

In one embodiment, the combustion chamber is advantageously made of a combustion chamber head section having a convergent portion of the combustion chamber nozzle and a separate trailing section which includes a convergent and divergent portion of the nozzle. The two sections are connected together through a flange connection. In addition, a nozzle insert arranged at the nozzle section includes walls which complement the wall portions of the forward and rear sections. A separate cooling circuit is connected to the nozzle insert to provide for the cooling of the nozzle insert walls, and in addition axial extending ducts are defined along the complete length of the combustion chamber walls.

In another embodiment, a separate circuit is provided for the head portion of the combustion chamber and the trailing portion of the combustion chamber as well as a separate conduit or circuit for the nozzle section. By providing three separate cooling circuits, the individual sections of the combustion chamber may be properly cooled considering all of the operational conditions which exist at these sections and the particular temperature ranges to which these parts will be subjected. The operational conditions are considered in the invention not only from a quantitative point of view in respect to the use of cooling liquid, but also in respect to the choice of the different cooling media. The individual cooling circuits may be supplied with varying or different amounts of different kinds of cooling liquids, particularly considering the nature of the material of which the particular components of the total construction are made.

Accordingly it is an object of the invention to provide a liquid fuel rocket engine combustion chamber construction in which several cooling circuits are provided for cooling the combustion chamber and nozzle sections and in which the cooling circuits are separately supplied with a cooling medium, preferably a fuel component.

A further object of the invention is to provide a combustion engine construction in which the nozzle section and portions of the combustion chamber are made of distinct parts and preferably wherein the nozzle section includes a separate nozzle insert and wherein each of the parts are advantageously cooled by one or more separate cooling conduit circuits.

A further object of the invention is to provide a liquid fuel rocket engine construction which includes a nozzle section formed with an insert and with means for circulating a cooling medium such as a fuel component to the insert and for discharging the cooling medium into the combustion chamber at the location of the nozzle.

A further object of the invention is to provide a liquid fuel rocket engine which is simple in design, rugged in construction and economical to manufacture.

The various features of novelty which characterize the invention are pointed out with particularity in the claims annexed to and forming a part of this specification. For a better understanding of the invention, its operating advantages and specific objects attained by its use, reference should be had to the accompanying drawings and descriptive matter in which there are illustrated and described preferred embodiments of the invention.

BRIEF DESCRIPTION OF THE DRAWINGS

In the drawings:

FIG. 1 is a partial axial sectional view of a rocket engine constructed in accordance with the invention;

FIG. 2 is a section taken on the line 2-2 of FIG. 1; and

FIG. 3 is a view similar to FIG. 1 of another embodiment of the invention.

GENERAL DESCRIPTION OF THE PREFERRED EMBODIMENTS

Referring to the drawings in particular, the invention embodied therein in FIGS. 1 and 2 comprises a liquid fuel rocket engine generally designated 40 which comprises two main construction parts or units, a first or head section generally designated 1, and a second or trailing section generally designated 4. The head section 1 includes a cylindrical combustion chamber portion 2, a convergent nozzle portion 3, and an intermediate convergent portion or nozzle mounting section 3a. A ring or flange 6 is secured to the intermediate convergent portion 3a and it is joined to an intermediate convergent portion or nozzle mounting section 5a of the trailing section 4 which also carries a ring 6' which is arranged in abutting relationship to the ring 6 of the main section 1. The trailing section 4 also includes an outwardly divergent portion 5.

When the two constructional sections 1 and 4 are joined together, they define an intermediate nozzle area through the length of the intermediate nozzle portions 3a and 5a of the parts. Each of the units 1 and 4 is of double wall construction, and a plurality of laterally abutting individual longitudinally extending conduits 7 are defined around the periphery which provide interconnecting through passages for the passage of a propellant component, particularly liquid oxygen which is employed as a coolant for the walls. The units are sealed together at the juncture or parting line 15 by means of a spaced sealing wall 13 which carries sealing rings 14, 14 which are arranged on respective sides of the sealing parting line 15.

In the range of the nozzle neck which extends along the intermediate nozzle portions 3a and 5a, there is provided a nozzle neck insert 8 which has an outer configuration or contour which is partially conically divergent and convergent to form a continuation of the convergent portion 3 and to from a continuation of the divergent portion 5. The nozzle neck insert 8 includes an annular channel formation comprising an inlet 9 and a double wall 11 which defines a cooling channel 10 which communicates at one end with the inlet 9 and at an opposite end with an annular discharge chamber 12. The chamber 12 leads to a discharge duct or annular slot 19 which has an opening along an edge 18 for discharging the liquid fuel component into the combustion chamber at the location of the nozzle insert. An annular liquid supply conduit 17 opens tangentially through ducts or conduits 16 into the annular inlet chamber 9 and provides a cooling circuit B for supplying a cooling liquid through the passage 10 and the slot 19 for discharge into the combustion chamber along the free edge 18 to produce a fog or veil-like cooling spray in the combustion chamber at the location of the nozzle neck. It is also possible to provide a veil-cooling along with a regenerative cooling at which the cooling medium in cooling the walls takes on heat before it is used for combustion purposes. The circulating flow which is caused in the inlet chamber 9 continues in the channel 10 as a screw or helical flow path during which the heat exchange takes place in a very desirable manner. Due to the inherent spin or twist of flow, the cooling liquid which exists from the annular slot 19 is directed in a film against the inner sides of the double wall 11 and forms a further protection for this wall. This is possible because of the centrifugal action imparted to the liquid which causes it to extend along a substantial axial length of the wall of the nozzle neck insert 8.

The nozzle neck insert 8, when viewed in a longitudinal direction, is longer on the convergent side adjacent the portion 3a than on the divergent side adjacent the portion 5a. The cooling arrangement permits consideration of the fact that there will be a higher temperature at the narrowest cross section and at areas slightly beyond this narrow cross section. This means that with an equal axial length of the nozzle neck insert 8 that zone which is exposed most from the heat standpoint which is in front of the narrowest cross section is provided with the most beneficial cooling.

The nozzle neck insert 8 is advantageously constructed as a separate unit and it may be made of material distinct from that of the main portion 1 and the trailing or nozzle portion 4. The nozzle neck insert 8 is advantageously made from a chemically resistant material which is very stable to high heat, for example a compound material having good heat conductivity or a material which is provided with a coating of high thermal and chemical resistance, such as a gold coating. Although gold is very expensive, the high cost would still be bearable and the use of gold would be economical due to the small dimension of the nozzle neck insert 8 relative to the total unit complex, including the parts 1 and 4.

Special cooling materials or agents with high evaporation heat and small fuel content may be used in the separate cooling circuit of the nozzle neck insert 8. Thus, for example, water, alcohol, or ammonia may be used for this purpose. The nozzle neck insert 8 may be made of a separate replaceable part so that the manufacture of each of the parts 8, 1 and 4 is very simple and inexpensive. The insert 8 may be made as a closed unit or a unit which includes means for directing a veil of a liquid fuel component along the interior wall of the combustion chamber. The three-part construction of the combustion chamber makes it possible to design each of the parts for their own particular function. Before the nozzle neck insert 8 is arranged to be freely expandable in an axial direction, the tension or stresses caused by temperature changes are significantly decreased.

In the embodiment indicated in FIG. 3, there is provided a combustion chamber construction or liquid fuel rocket engine generally designated 42 which is made up of two units comprising an upstream unit or combustion chamber head unit 1a and a downstream unit or combustion chamber discharge section 4a. The unit 1a and the unit 4a carry flanges 20 and 20', respectively, which are arranged in overlapping abutting relationship and are secured together such as with the use of securing bolts (not shown). A sealing ring 22 is inserted at the end of the flange 20' in a position to seal the separating joint or gap 21.

In the embodiment of FIG. 2, a nozzle section or nozzle neck 8a is formed as a separate insert having spaced walls 44, 46 which define a cooling channel 48 for circulating a cooling liquid along the exterior of wall 44 of a nozzle insert section 50. In accordance with a feature of the construction of FIG. 3, a separate and distinct cooling circuit D is provided for circulating a cooling liquid through the passage 48. The cooling circuit D includes an inlet ring 52 which is supplied with a liquid fuel component which is directed through passages 54 tangentially into an annular inlet chamber 56 which communicates with one end of the passage 48. The discharge end of the passage 48 communicates with a discharge chamber 58 which in turn connects through tangential lines 60 to an annular discharge 62.

The complete combustion chamber indicated in the embodiment of FIG. 3 also includes the divergent nozzle section 5a the walls of which are cooled by a plurality of passages 64 supplied by a cooling fluid circuit C. In addition, the head portion 1a includes a uniform diameter portion 2a and a converging portion 3a, the walls of which are cooled by liquid circulating through a passage 66 of a separate cooling circuit E.

The flow of cooling liquid through the circuits C and E is preferably through an annular inlet 70 and in a direction indicated by the arrow 72 and 74, respectively, in a counterflow direction to the movement of the thrust gases in the combustion engine 42. The inlet chamber 70' for the passage 64 is located at the extreme end of the combustion chamber and is not illustrated. The passages 64 and 66 discharge at their inner ends in a collecting chamber 74 and 74'. Only the chamber 74' for the passage 64 is illustrated. The two cooling circuits C and E are preferably employed for directing a propellant component, namely liquid fuel and/or oxygen therethrough. In some instances it is desirable to supply the thrust nozzle circuit D with a portion of the liquid oxygen and to charge the other oxygen portion to the cooling circuit E and the two oxygen portions are divided in the ratio of the temperature conditions to which they will be subjected.

The construction indicated in FIG. 3 may be made as simply as that indicated in FIGS. 1 and 2 in respect to the interfitting of the parts and the use of the inexpensive materials. In addition, use of the three cooling circuits C, D and E permits an optimum condition for tuning and controlling of the cooling in accordance with the particular temperature conditions within the combustion chamber.

I claim:

1. A rocket engine combustion chamber construction comprising a housing having walls defining a substantially cylindrical head section, an intermediate converging and diverging nozzle section and a trailing section, a separate nozzle neck insert arranged in said intermediate section and forming a continuation of said head section and said trailing section and defining an interior wall of said combustion chamber, said nozzle neck insert having ends which are out of abutting contact with, and being freely expandable in axial directions independently of, said head section and said trailing section, at least one first flow circuit having a flow path in heat exchange contact with said walls at selected locations therealong for circulating a separately controlled cooling liquid in heat exchange contact with said wall in each of said head section and said trailing section, and a separate second flow circuit having a flow path in heat exchange contact with said interior wall of said nozzle neck insert.

2. A rocket engine combustion chamber construction according to claim 1, wherein said first flow circuit defines a flow path in heat exchange contact with the walls of both said head section and said trailing section.

3. A rocket engine combustion chamber construction according to claim 1, wherein said nozzle insert includes a converging portion adjacent said head section and a diverging portion adjacent said trailing section, said converging portion being of a greater length than said diverging portion.

4. A rocket engine combustion chamber construction according to claim 1, wherein said nozzle neck insert is made of a different material than said cylindrical head section and said trailing section, the material being a heat and chemical-resistant material.

5. A rocket engine combustion chamber construction according to claim 1, wherein said nozzle insert includes a porous wall to permit the sweat cooling of the interior of the combustion chamber by the passage of liquid from said cooling chambers through said openings.

6. A rocket engine combustion chamber comprising a housing having walls defining a first section defining a substantially cylindrical head having an intermediate converging nozzle forming wall and an end nozzle insert-mounting wall, a second section having a divergent wall defining a partial nozzle expansion section and an intermediate nozzle insert mounting wall joined to the intermediate nozzle mounting wall of said first section, means defining a plurality of first flow passages along the walls of said first and second sections, and a first fluid flow circuit connected to said first flow passages for circulating a cooling fluid through said first passages, a separate nozzle insert member secured to the intermediate nozzle insert-mounting wall defined by said first and second sections and including a converging wall aligned with and complementary to the intermediate converging wall of said first section and a divergent wall portion extending from the inner end of said nozzle insert converging wall portion and diverging outwardly into alignment with and complementary to the divergent wall portion of said second section, second means defining second fluid flow passages along the walls of said nozzle insert member, and a second separate cooling circuit connected to said second flow passages for circulating a separate cooling fluid through said second passages.

7. A rocket engine combustion chamber according to claim 6, wherein said intermediate nozzle section comprises a member made of a separate material secured to said first and second sections, said second cooling circuit including an annular inlet connected to said second cooling passages adjacent the converging end of said nozzle section and an annular discharge connected to said cooling passages adjacent the converging ends of said nozzle section, said annular discharge passage including at least one opening for discharging the cooling medium into the combustion chamber.

8. A rocket engine combustion chamber according to claim 7, including a flange secured to each of said first and second sections for securing said sections together at said flanges.

9. A rocket engine combustion chamber according to claim 7, wherein said first and second sections are arranged in overlapping abutting relationship, and means for sealing the joint between said first and second sections.

10. A rocket engine combustion chamber according to claim 6, wherein said first flow passages are divided into a first set of flow passages for cooling said second section and second set of flow passages for cooling said first section, said first fluid flow circuit associated with said first fluid flow passages comprises a separate head section cooling circuit connected to the passages adjacent said nozzle discharge section.

11. A rocket engine combustion chamber construction comprising a housing having walls defining a substantially cylindrical head section, an intermediate converging and diverging nozzle section and a trailing section, a separate nozzle neck insert arranged in said intermediate section and forming a continuation of said head section and said trailing section and defining an interior wall of said combustion chamber, said nozzle neck insert being freely expandible in axial directions independently of said head section and said trailing section, at least one first flow circuit having a flow path in heat exchange contact with said walls at selected locations therealong for circulating a separately controlled cooling liquid in heat exchange contact with said wall in each of said head section and said trailing section, a separate second flow circuit having a flow path in heat exchange contact with said interior wall of said nozzle neck insert, said cylindrical head section and said trailing section including an intermediate portion defining a nozzle insert support area, and means joining said head section and said trailing section together, said separate nozzle neck insert being carried on said nozzle support section and extending inwardly from said housing to define a converging and diverging nozzle section, said second flow circuits including separate means for circulating liquid in heat exchange relationship with the walls of said separate insert and for directing said liquid tangentially along said walls.

12. A rocket engine combustion chamber construction comprising a housing having walls defining a substantially cylindrical head section, an intermediate converging and diverging nozzle section and a trailing section, a separate nozzle neck insert arranged in said intermediate section and forming a continuation of said head section and said trailing section and defining an interior wall of said combustion chamber, said nozzle neck insert being freely expandible in axial directions independently of said head section and said trailing section, at least one first flow circuit having a flow path in heat exchange contact with said walls at selected locations therealong for circulating a separately controlled cooling liquid in heat exchange contact with said wall in each of said head section and said trailing section, a separate second flow circuit having a flow path in heat exchange contact with said interior wall of said nozzle neck insert, said nozzle neck insert including a plurality of axially extending flow passages, an annular chamber connecting said flow passages at one end and defining an inlet for cooling liquid, and an annular chamber connected to said passages at the opposite end defining a discharge for the cooling liquid.

13. A rocket engine combustion chamber construction according to claim 12, wherein said annular discharge chamber has at least one opening into the combustion chamber for directing a coolant liquid into the opening along the exterior of the walls of said insert.

14. A rocket engine combustion chamber construction according to claim 12, wherein said annular discharge chamber includes an annular wall located within said combustion chamber and spaced from the wall defining the cooling passages of said insert to define a discharge slot directed into said combustion chamber.